(12) United States Patent
Kaneichi et al.

(10) Patent No.: US 11,692,831 B2
(45) Date of Patent: Jul. 4, 2023

(54) PROGRAM AND INFORMATION PROCESSING METHOD FOR DETERMINING A TRAVEL ROUTE OF A RIDE-SHARING VEHICLE

(71) Applicant: TOYOTA JIDOSHA KABUSHIKI KAISHA, Toyota (JP)

(72) Inventors: Daiki Kaneichi, Nisshin (JP); Daisuke Tanabe, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 16/794,341

(22) Filed: Feb. 19, 2020

(65) Prior Publication Data
US 2020/0292334 A1 Sep. 17, 2020

(30) Foreign Application Priority Data
Mar. 11, 2019 (JP) ................. 2019-043978

(51) Int. Cl.
*G01C 21/34* (2006.01)
*G01C 21/36* (2006.01)

(52) U.S. Cl.
CPC ....... *G01C 21/343* (2013.01); *G01C 21/3438* (2013.01); *G01C 21/362* (2013.01); *G01C 21/3676* (2013.01)

(58) Field of Classification Search
None
See application file for complete search history.

(56) References Cited

U.S. PATENT DOCUMENTS

| | | | |
|---|---|---|---|
| 2018/0188056 A1* | 7/2018 | Hardee | G01C 21/3676 |
| 2018/0326997 A1* | 11/2018 | Sweeney | B60W 50/10 |
| 2019/0103028 A1* | 4/2019 | Kobayashi | G06Q 50/30 |

FOREIGN PATENT DOCUMENTS

| | | | |
|---|---|---|---|
| JP | 2009-008576 A | | 1/2009 |
| JP | 2009008576 A | * | 1/2009 |
| JP | 2017-182137 A | | 10/2017 |

* cited by examiner

*Primary Examiner* — Yuen Wong
*Assistant Examiner* — Hongye Liang
(74) *Attorney, Agent, or Firm* — Oliff PLC (57) ABSTRACT

A program causes an information processing device communicable with a server to execute steps of: displaying stoppage points of the specific vehicle and at least part of a travel route passing through the stoppage points; transmitting the server a first request to modify the travel plan so that a user of the information processing device gets on the specific vehicle or gets off the specific vehicle at the stoppage point when the stoppage point is designated by a user operation; and transmitting the server a second request to modify the travel plan so that the specific vehicle goes by way of the designated point as an additional stoppage point and the user gets on the specific vehicle or gets off the specific vehicle at the additional stoppage point when the point other than the stoppage points is designated by the user operation.

6 Claims, 9 Drawing Sheets

| STOPPAGE POINT ID | DEPARTURE TIME | GET-ON USER ID | GET-OFF USER ID | TRAVEL ROUTE |
|---|---|---|---|---|
| P01 | 10:00 | U01 | – | *** |
| P05 | 10:10 | U02 | U01 | |
| P12 | 10:20 | U03 | U02 | |
| P09 | 10:30 | – | U03 | |

PROGRAM AND INFORMATION PROCESSING METHOD FOR DETERMINING A TRAVEL ROUTE OF A RIDE-SHARING VEHICLE

INCORPORATION BY REFERENCE

The disclosure of Japanese Patent Application No. 2019-043978 filed on Mar. 11, 2019 including the specification, drawings and abstract is incorporated herein by reference in its entirety.

BACKGROUND

1. Technical Field

The present disclosure relates to a program and an information processing method.

2. Description of Related Art

In the related art, there has been known a technology related to vehicles such as an automobile, for example. For example, Japanese Unexamined Patent Application Publication No. 2009-008576 (JP 2009-008576 A) describes a navigation device configured to perform a route guidance by setting, as a destination, one of a plurality of candidate destinations that are parking lots or getting on and off points. The navigation device also performs a route guidance by changing the destination to a destination other than a current destination in response to an instruction from a user to change the destination. The destination other than the current destination is selected from among the candidate destinations.

SUMMARY

In recent years, there has been known a passenger transportation service in which a travel route of a ride-sharing vehicle is determined based on a boarding reservation made by a user. The passenger transportation service is, for example, ride-sharing in which a plurality of users rides together in a vehicle, an on-demand bus that can travel on a route other than a normal circuit route, and so on. However, users who are accustomed to using conventional shuttle bus service in which a travel route is determined in advance, for example, may sometimes feel complicated about procedure for using recent passenger transportation service in which a travel route can change each time. Thus, for some users, the recent passenger transportation service is not necessarily convenient so much. Accordingly, there is room for improvement in convenience of passenger transportation service in which a travel route of a ride-sharing vehicle is determined based on a boarding reservation made by a user.

An object of the present disclosure that is accomplished in view of such a circumstance is to improve convenience of passenger transportation service in which a travel route of a ride-sharing vehicle is determined based on a boarding reservation made by a user.

A program according to one aspect of the present disclosure is a program for causing an information processing device communicable with a server, the server being configured to manage a travel plan of a specific vehicle, to execute: a step of receiving information about the travel plan from the server; a first display step of displaying, on a screen, stoppage points of the specific vehicle and at least part of a travel route passing through the stoppage points, based on the information about the travel plan; an operation step of waiting for a user operation to designate a stoppage point on the screen or a point other than the stoppage points; a step of transmitting a first request to the server when the stoppage point is designated by the user operation, the first request being a request to modify the travel plan so that a user of the information processing device gets on the specific vehicle or gets off the specific vehicle at the stoppage point; and a step of transmitting a second request to the server when the point other than the stoppage points is designated by the user operation, the second request being a request to modify the travel plan so that the specific vehicle goes by way of the designated point as an additional stoppage point and the user gets on the specific vehicle or gets off the specific vehicle at the additional stoppage point.

A program according to one aspect of the present disclosure is a program for causing a server configured to manage a travel plan of a specific vehicle to execute: a step of transmitting information about the travel plan to an information processing device; a step of waiting for a first request or a second request from the information processing device; a step of, upon receipt of the first request, making modifications to the travel plan and reflecting the modifications on the travel plan so that a user of the information processing device gets on the specific vehicle or gets off the specific vehicle at a stoppage point designated by the first request; a step of, upon receipt of the second request, determining whether or not to cause the specific vehicle to go by way of a point designated by the second request as an additional stoppage point; a step of, when the server determines to cause the specific vehicle to go by way of the point thus designated as the additional stoppage point, modifying the travel plan so that the specific vehicle goes by way of the additional stoppage point and the user gets on the specific vehicle or gets off the specific vehicle at the additional stoppage point; and a step of, when the server determines not to cause the specific vehicle to go by way of the point thus designated as the additional stoppage point, notifying the information processing device of rejection of the second request.

An information processing method according to one aspect of the present disclosure is an information processing method executed by an information processing device communicable with a server, the server being configured to manage a travel plan of a specific vehicle. The information processing method includes: a step of receiving information about the travel plan from the server; a first display step of displaying, on a screen, stoppage points of the specific vehicle and at least part of a travel route passing through the stoppage points, based on the information about the travel plan; an operation step of waiting for a user operation to designate a stoppage point on the screen or a point other than the stoppage points; a step of transmitting a first request to the server when the stoppage point is designated by the user operation, the first request being a request to modify the travel plan so that a user of the information processing device gets on the specific vehicle or gets off the specific vehicle at the stoppage point; and a step of transmitting a second request to the server when the point other than the stoppage points is designated by the user operation, the second request being a request to modify the travel plan so that the specific vehicle goes by way of the designated point as an additional stoppage point and the user gets on the specific vehicle or gets off the specific vehicle at the additional stoppage point.

With the program and the information processing method according to one aspect of the present disclosure, it is possible to improve convenience of passenger transportation service in which a travel route of a ride-sharing vehicle is determined based on a boarding reservation made by a user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes an embodiment of the present disclosure.

Configuration of Information Processing System

Figure 1:
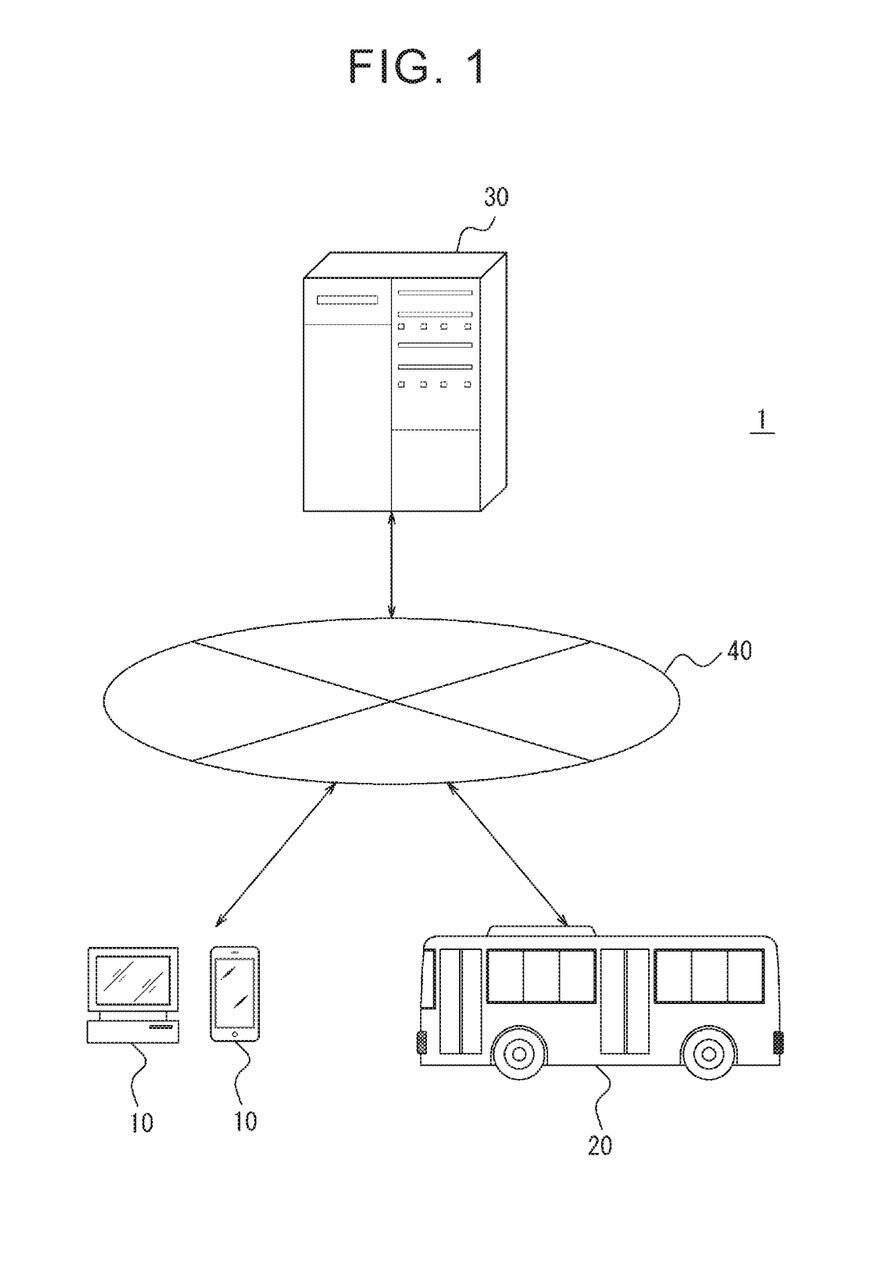
FIG. 1 is a view illustrating a schematic configuration of an information processing system according to one embodiment of the present disclosure.

With reference to FIG. 1, the following describes a schematic configuration of an information processing system 1 according to one embodiment of the present disclosure. In the present embodiment, the information processing system 1 is used to provide on-demand bus service. However, the information processing system 1 is not limited to this and may be used to provide given passenger transportation service in which a travel route of a ride-sharing vehicle is determined based on a boarding reservation made by a user. The information processing system 1 includes an information processing device 10, a specific vehicle 20, and a server 30. The information processing device 10, the specific vehicle 20, and the server 30 are communicable with each other via a network 40 including a mobile communication network, the Internet, and so on, for example.

The information processing device 10 is an information processing device such as a personal computer (PC) or a smartphone, for example. However, the information processing device 10 is not limited to them and may be a given information processing device used by a user. In FIG. 1, for simpleness and easiness of description, only two information processing devices 10 are illustrated, but the information processing system 1 may include a given number of information processing devices 10.

The specific vehicle 20 is a passenger transportation vehicle such as a bus to be used in the on-demand bus service, for example. However, the specific vehicle 20 is not limited to this and may be a given vehicle that can be shared by a plurality of users as passengers. In FIG. 1, for simpleness and easiness of description, only one specific vehicle 20 is illustrated, but the information processing system 1 may include a plurality of specific vehicles 20. Further, the specific vehicle 20 may be a vehicle in which automated driving is enabled. The automated driving includes level 1 to level 5 defined by Society of Automotive Engineers (SAE), for example. However, the automated driving is not limited to this and may be defined in a given manner. Further, the specific vehicle 20 may transmit, to the server 30, given information about the specific vehicle 20 such as a position or a traveling state of the specific vehicle 20, for example, as probe data. The transmission of probe data is performed periodically, for example. However, the transmission of probe data is not limited to this and may be performed at a given timing.

The server 30 includes one server device or a plurality of server devices communicable with each other. The server 30 is used by a provider of the on-demand bus service, for example, and manages a travel plan of the specific vehicle 20. More specifically, the server 30 determines and modifies information about a travel plan of the specific vehicle 20 based on a boarding reservation received from a user. As will be described later, the information about the travel plan is information indicative of a plurality of stoppage points at which the specific vehicle 20 stops so that a passenger gets on or off the specific vehicle 20, a travel route passing through the stoppage points, and so on, for example. The server 30 can execute a given process related to the travel plan of the specific vehicle 20 in addition to the process of determining and modifying the information about the travel plan.

Further, the server 30 may manage a state of the specific vehicle 20. More specifically, the server 30 can recognize past or current position, traveling state, and so on of the specific vehicle 20 by collecting and accumulating probe data transmitted from the specific vehicle 20.

First described is an outline of the present embodiment. Details of the present embodiment will be described later. Herein, the server 30 determines and stores information about a travel plan of the specific vehicle 20 based on boarding reservations received from a plurality of unspecified users in advance, for example. The information processing device 10 used by a user receives the information about the travel plan of the specific vehicle 20 from the server 30. The information processing device 10 displays stoppage points and a travel route of the specific vehicle 20 on a screen based on the information. The information processing device 10 waits for a user operation to designate a stoppage point on the screen or a point other than the stoppage points.

When the stoppage point is designated, the information processing device 10 transmits, to the server 30, a first request to modify the travel plan so that the user of the information processing device 10 gets on the specific vehicle 20 or gets off the specific vehicle 20 at the stoppage point. The server 30 thus receiving the first request makes modifications to the travel plan of the specific vehicle 20 and reflects the modifications on the travel plan in accordance with the first request. In such a configuration, as the user of the information processing device 10 designates the stoppage point on the screen, the user can make a boarding reservation of the specific vehicle 20 so that the user gets on or off the specific vehicle 20 at the stoppage point.

In the meantime, when the point other than the stoppage points is designated, the information processing device 10 transmits, to the server 30, a second request to modify the travel plan so that the specific vehicle 20 goes by way of the designated point as an additional stoppage point and the user of the information processing device 10 gets on the specific vehicle 20 or gets off the specific vehicle 20 at the additional stoppage point. The server 30 thus receiving the second request can modify the travel plan of the specific vehicle 20 in accordance with the second request. Accordingly, as the user of the information processing device 10 designates the point other than the stoppage points on the screen, the user can make a boarding reservation of the specific vehicle 20 so that the user gets on or off the specific vehicle 20 at the designated point.

As such, in the present embodiment, for example, the user checks stoppage points and a travel route of the specific vehicle 20 at the present moment on the screen of the information processing device 10, and in a case where a desired stoppage point is included in the stoppage points, the user can make a boarding reservation so that the user gets on or off the specific vehicle 20 at the stoppage point. Even in a case where a desired stoppage point is not included in the stoppage points, the user can make a boarding reservation so that the user gets on or off the specific vehicle 20 at a designated point (that is, an additional stoppage point) other than the stoppage points. This accordingly improves convenience of the passenger transportation service in which a travel route of a ride-sharing vehicle is determined based on a boarding reservation made by a user.

Next will be described each constituent of the information processing system 1 in detail.

Configuration of Information Processing Device

Figure 2:
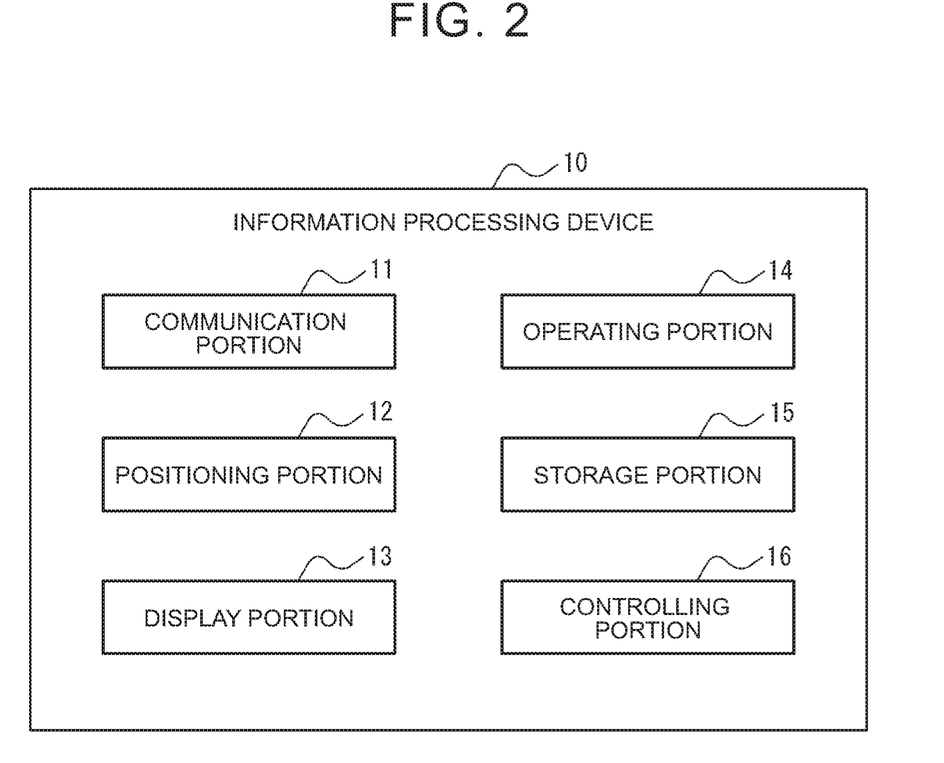
FIG. 2 is a block diagram illustrating a schematic configuration of an information processing device.

As illustrated in FIG. 2, the information processing device 10 includes a communication portion 11, a positioning portion 12, a display portion 13, an operating portion 14, a storage portion 15, and a controlling portion 16.

The communication portion 11 includes a communication module connected to the network 40. The communication module corresponds to, for example, mobile telecommunications standards such as 4th Generation (4G) and 5th Generation (5G), wired local area network (LAN) standards, wireless LAN standards, and so on. However, the communication module is not limited to them and may correspond to a given telecommunications standard. In the present embodiment, the information processing device 10 is connected to the network 40 via the communication portion 11.

The positioning portion 12 acquires a position of the information processing device 10. For example, the positioning portion 12 may include a receiver corresponding to a satellite positioning system. The receiver corresponds to, for example, a global positioning system (GPS). However, the receiver is not limited to this and may correspond to a given satellite positioning system. Alternatively, the positioning portion 12 may acquire the position of the information processing device 10 from the network 40 via the communication portion 11.

The display portion 13 includes a display configured to output information in the form of an image. In the present embodiment, to "output information in the form of an image" includes a case where information is displayed on the screen in the form of a text, a still image, a dynamic image, or the like. Further, the "display" indicates a panel display, an immersive or transmissive head mount display, or the like but is not limited to them. In a case where a transmissive head mount display is employed as the display portion 13, the "screen" may include an actual landscape observable by a user through the transmissive head mount display.

The operating portion 14 includes one or more input interfaces configured to detect an input by a user operation. For example, the input interface included in the operating portion 14 is a physical key, an electrostatic capacitive key, a touch panel, a touchscreen provided integrally with the display of the display portion 13, a microphone configured to receive a voice input, or the like. However, the input interface is not limited to them.

The storage portion 15 includes one or more memories. In the present embodiment, the "memory" is a semiconductor memory, a magnetic memory, an optical memory, or the like but is not limited to them. Each memory included in the storage portion 15 may function as a main storage device, an auxiliary storage device, or a cache memory, for example. In the storage portion 15, given information to be used for operations of the information processing device 10 is stored. For example, in the storage portion 15, a system program, an application program, map information, and so on may be stored. The information stored in the storage portion 15 may be updatable by information acquired from the network 40 via the communication portion 11, for example.

The controlling portion 16 includes one or more processors. In the present embodiment, the "processor" indicates a general purpose processor, a dedicated processor specialized in a specific process, or the like, but is not limited to them. The controlling portion 16 controls operations of the whole information processing device 10.

For example, the controlling portion 16 receives information about a travel plan of the specific vehicle 20 from the server 30 via the communication portion 11. As will be described later, the information about the travel plan includes information on a plurality of stoppage points for the specific vehicle 20, a travel route passing through the stoppage points, and so on, for example. In the present embodiment, each of the stoppage points is selected from a plurality of candidate points (described later). However, each of the stoppage points is not limited to this and may be determined in a given manner.

Further, the controlling portion 16 may receive area information from the server 30 via the communication portion 11. The area information includes, for example, information indicative of at least either one of a stopping prohibition area and a vehicle stoppable area (described later). In the present embodiment, the "area" may indicate a region having a given area on a map or may indicate a point that does not have an area on the map.

The stopping prohibition area indicates, for example, an area where vehicles are legally prohibited from stopping (e.g., an area near an intersection, a zebra zone, or the like, an area where vehicles are prohibited from stopping by a mark or a sign, and so on). The vehicle stoppable area indicates an area where a passenger of the specific vehicle 20 can get on and off the specific vehicle 20 other than the stopping prohibition area (e.g., an area where a sidewalk is provided beside a roadway and there is no obstacle such as a fence or a guard rail between the roadway and the sidewalk, and so on). In the present embodiment, the vehicle stoppable area includes a plurality of candidate points. The candidate point is a point as a candidate where the specific vehicle 20 is to stop.

Further, the controlling portion 16 determines a reference point on the map. More specifically, the controlling portion 16 determines, as the reference point, a current point based on the position of the information processing device 10 that is acquired by the positioning portion 12 or a designated point based on a user operation on the operating portion 14. The determination of the reference point may be performed while the map is displayed on the screen of the display portion 13, for example.

Figure 3:
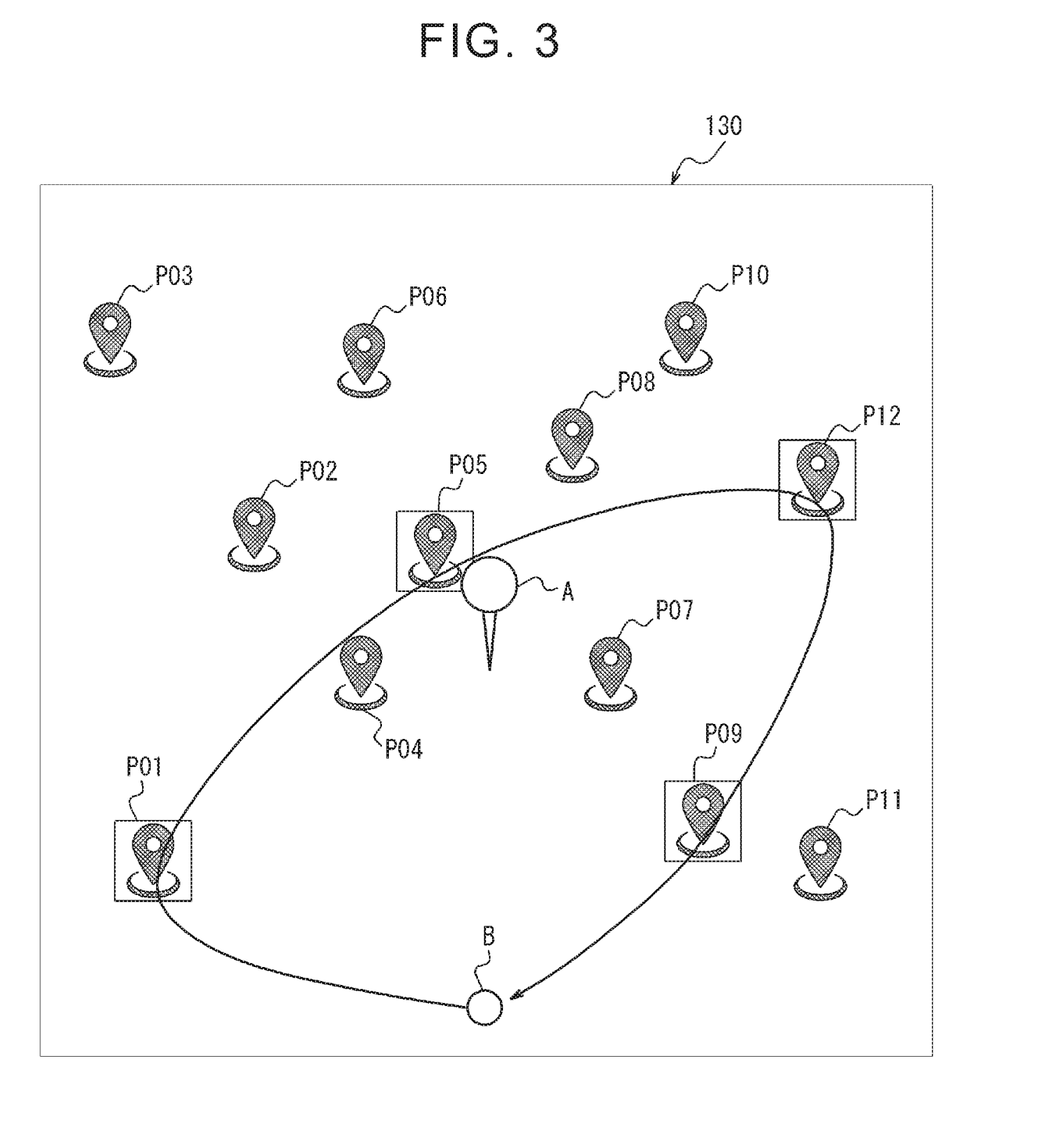
FIG. 3 is a view illustrating an example of a screen displayed by the information processing device.

Further, the controlling portion 16 may display at least the reference point in a wide area map on the screen of the display portion 13. Here, the controlling portion 16 may display, in a wide area map on the screen of the display portion 13, all the stoppage points and the whole travel route of the specific vehicle 20 that are indicated by the information about the travel route and at least either one of the stopping prohibition area and the vehicle stoppable area indicated by the area information, in addition to the reference point. For example, in the example illustrated in FIG. 3, a reference point A, 12 candidate points P01 to P12 (among them, P01, P05, P12, P09 surrounded by frames in the figure are also stoppage points), and a travel route (a continuous arrow in the figure) that passes through a departure point B of the specific vehicle 20 and four stoppage points P01, P05, P12, P09 in this order are displayed in a wide area map on a screen 130.

Figure 4:
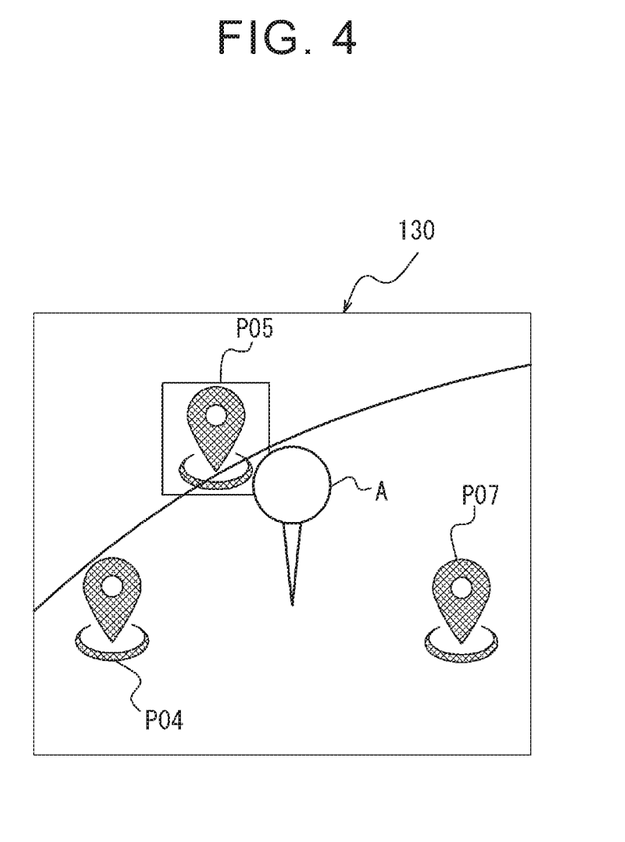
FIG. 4 is a view illustrating an example of the screen displayed by the information processing device.

Further, for example, after the controlling portion 16 displays the wide area map on the screen of the display portion 13, the controlling portion 16 may display the reference point, a predetermined number of stoppage points selected in an order closer to the reference point, and at least part of the travel route in a narrow area map on the screen of the display portion 13. Here, the controlling portion 16 may display at least either one of the stopping prohibition area and the vehicle stoppable area indicated by the area information in a narrow area map on the screen of the display portion 13, in addition to the reference point, one or more stoppage points, and at least part of the travel route. Alternatively, the controlling portion 16 may display a predetermined number of candidate points selected in an order closer to the reference point in a narrow area map on the screen of the display portion 13, in addition to the reference point, one or more stoppage points, and at least part of the travel route. For example, in the example illustrated in FIG. 4, the reference point A, three candidate points P04, P05, P07 that are placed near the reference point A (among them, P05 surrounded by a frame in the figure is also a stoppage point), and part of the travel route (a continuous line passing through the stoppage point P05 in the figure) are displayed in a narrow area map on the screen 130. Here, screen transition from a wide area map to a narrow area map is performed by a technique in which the wide area map is zoomed up and changed to the narrow area map, for example. However, the screen transition is not limited to this and may be performed in a given manner.

Further, the controlling portion 16 waits for a user operation to designate a stoppage point on the screen or a point other than the stoppage points.

When the stoppage point on the screen is designated by the user operation, the controlling portion 16 transmits, to the server 30 via the communication portion 11, the first request to modify the travel plan so that the user of the information processing device 10 gets on the specific vehicle 20 or gets off the specific vehicle 20 at the stoppage point. The first request may include, for example, a user ID of the user of the information processing device 10, a stoppage point ID of the designated stoppage point, data indicating whether the user is to get on or get off the specific vehicle 20, and data as identification of the first request.

In the meantime, when the point other than the stoppage points on the screen is designated by the user operation, the controlling portion 16 transmits, to the server 30 via the communication portion 11, the second request to modify the travel plan so that the specific vehicle 20 goes by way of the designated point as an additional stoppage point and the user of the information processing device 10 gets on the specific vehicle 20 or gets off the specific vehicle 20 at the additional stoppage point. The second request may include, for example, the user ID of the user of the information processing device 10, positional information of the designated point, data indicating whether the user is to get on or get off the specific vehicle 20, and data as identification of the second request.

Note that, in the present embodiment, the point other than the stoppage points is selectable from one or more candidate points displayed on the screen. However, designation of the point other than the stoppage points is not limited to this example, and a given technique can be employed. For example, the point other than the stoppage points may be selectable from an area other than the stopping prohibition area on the map displayed on the screen. Further, for example, the point other than the stoppage points may be also selectable from the vehicle stoppable area on the map displayed on the screen. Further, for example, the point other than the stoppage points may be selectable from an area other than a particular area on the map displayed on the screen. Here, the "particular area" may be an area within a predetermined distance from a stoppage point or a divisional area including a stoppage point among a plurality of divisional areas divided on the map. With such a configuration, the probability that a new stoppage point is added within a distance range relatively close to an existing stoppage point is reduced.

Further, the controlling portion 16 waits for a response from the server 30 after the controlling portion 16 transmits the second request. As the response from the server 30 receiving the second request, the controlling portion 16 can receive, from the server 30 via the communication portion 11, information about a travel plan modified based on the second request or a notification indicative of rejection of the second request.

When the controlling portion 16 receives the notification of rejection of the second request, the controlling portion 16 waits again for a user operation to designate a stoppage point on the screen or a point other than the stoppage points. Here, the controlling portion 16 may wait again for the user operation after the controlling portion 16 displays, on the screen of the display portion 13, a message indicating that the second request having been rejected, for example.

In the meantime, when the controlling portion 16 receives the information about the modified travel plan, the controlling portion 16 displays, on the screen, the stoppage points, the additional stoppage point, and at least part of the modified travel route that passes through the stoppage points and the additional stoppage point, based on the information.

Figure 5:
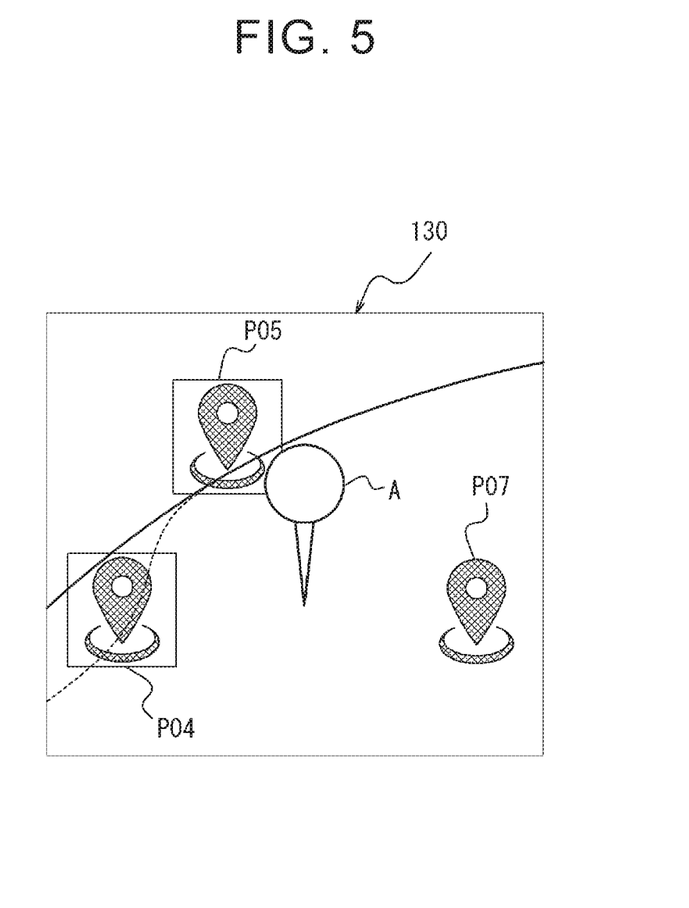
FIG. 5 is a view illustrating an example of the screen displayed by the information processing device.

For example, as illustrated in FIG. 5, the reference point A, three candidate points P04, P05, P07 that are placed near the reference point A (among them, P05 and P04 surrounded by frames in the figure are also a stoppage point and an additional stoppage point, respectively), part of the travel route before modification (a continuous line passing through the stoppage point P05 in the figure), and part of the modified travel route (a broken line passing through the stoppage points P04, P05 in the figure) may be displayed in a narrow area map on the screen 130.

Figure 6:
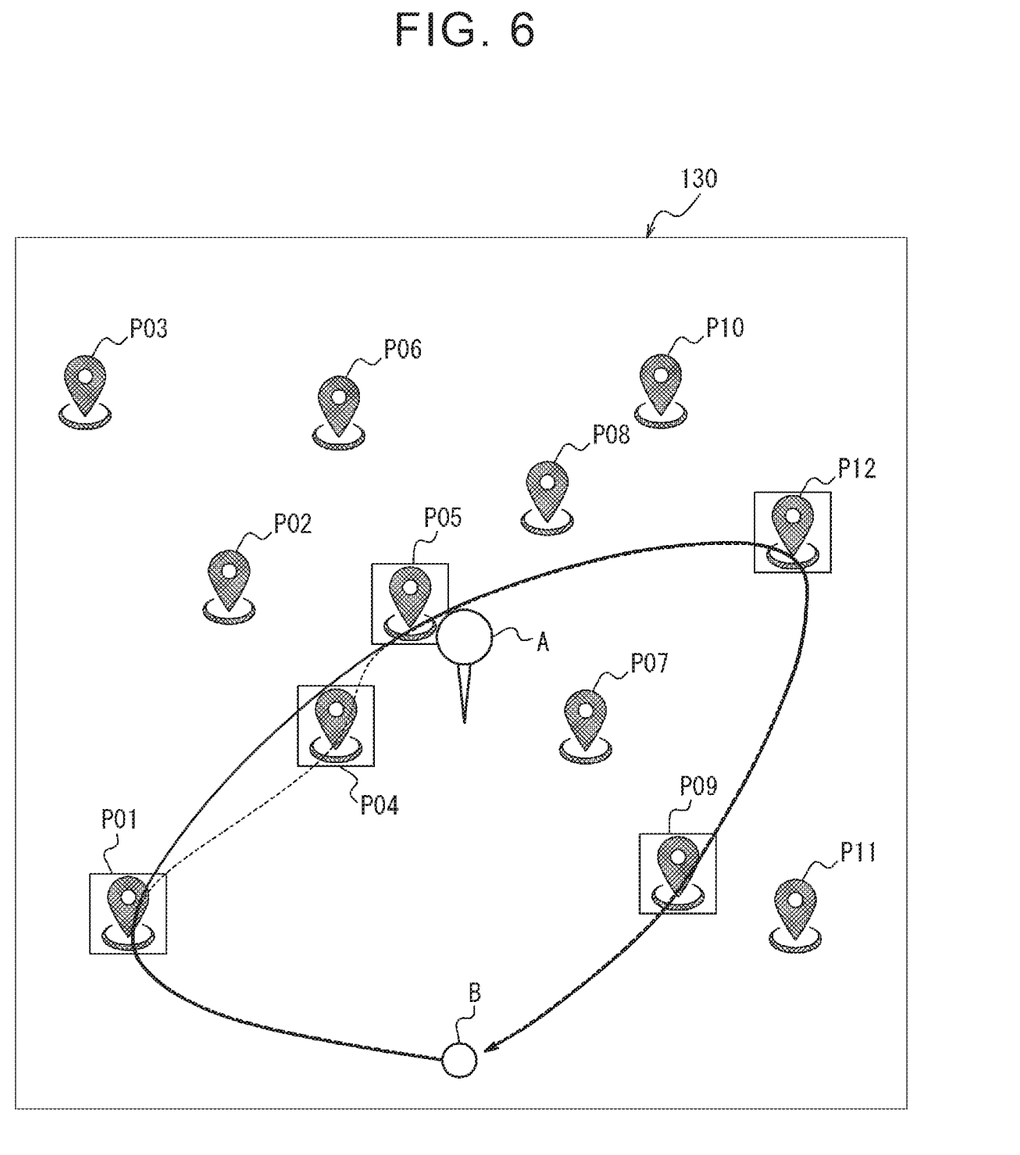
FIG. 6 is a view illustrating an example of the screen displayed by the information processing device.

Alternatively, for example, as illustrated in FIG. 6, the reference point A, the 12 candidate points P01 to P12 (among them, P01, P05, P12, P09 surrounded by frames in the figure are also stoppage points and P04 is also an additional stoppage point), the travel route before modification (a continuous arrow in the figure) that passes through the departure point B of the specific vehicle 20 and four stoppage points P01, P05, P12, P09 in this order, and the modified travel route (a broken arrow in the figure) that passes through the departure point B and five stoppage points P01, P04, P05, P12, P09 including the additional stoppage point in this order may be displayed in a wide area map on the screen 130.

After the controlling portion 16 displays, on the screen, the stoppage points, the additional stoppage point, and at least part of the modified travel route as described above, the controlling portion 16 waits for a user operation to select reflection or discard of modifications to the travel plan.

When the reflection of modifications on the travel plan is selected, the controlling portion 16 transmits, to the server 30 via the communication portion 11, a third request to reflect the modifications on the travel plan. The third request may include, for example, the user ID of the user of the information processing device 10 and data as identification of the third request.

In the meantime, when the discard of modifications to the travel plan is selected by the user operation, the controlling portion 16 transmits, to the server 30 via the communication portion 11, a fourth request to discard the modifications to the travel plan. The fourth request may include, for example, the user ID of the user of the information processing device 10 and data as identification of the fourth request.

With such a configuration, the user can determine whether or not to reflect the modifications on the travel plan, after the user checks the modified travel route and so on on the screen of the information processing device 10.

Configuration of Server

Figure 7:
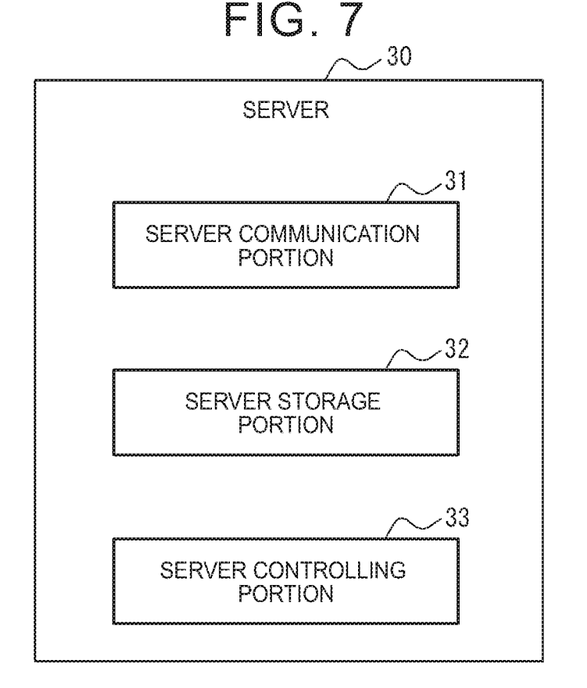
FIG. 7 is a block diagram illustrating a schematic configuration of a server.

As illustrated in FIG. 7, the server 30 includes a server communication portion 31, a server storage portion 32, and a server controlling portion 33.

The server communication portion 31 includes a communication module connected to the network 40. The communication module corresponds to the wired LAN standards, for example. However, the communication module is not limited to this and may correspond to given telecommunications standards. In the present embodiment, the server 30 is connected to the network 40 via the server communication portion 31.

The server storage portion 32 includes one or more memories. Each memory included in the server storage portion 32 may function as a main storage device, an auxiliary storage device, or a cache memory, for example. In the server storage portion 32, given information to be used for operations of the server 30 is stored. For example, in the server storage portion 32, a system program, an application program, area information, a vehicle database, a reservation database, and so on may be stored. The information stored in the server storage portion 32 may be updatable by information acquired from the network 40 via the server communication portion 31, for example.

Figure 8:
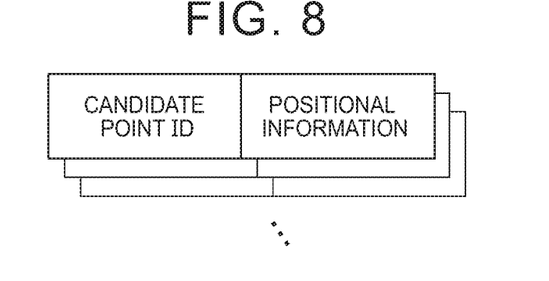
FIG. 8 is a view illustrating an example of candidate point information stored in the server.

The area information includes information indicative of at least either one of the stopping prohibition area and the vehicle stoppable area as described above. Further, the vehicle stoppable area may include a plurality of candidate points. For example, as illustrated in FIG. 8, the area information may include a candidate point ID and positional information for each of the candidate points as the information on the vehicle stoppable area.

In the vehicle database, probe data periodically transmitted from the specific vehicle 20 is stored and accumulated, for example. The probe data includes, for example, information on a position and a traveling state of the specific vehicle 20. However, the probe data is not limited to this and may include given information about the specific vehicle 20. The server 30 can recognize past or current position, traveling state, and so on of the specific vehicle 20 by referring to the vehicle database.

Figure 9:
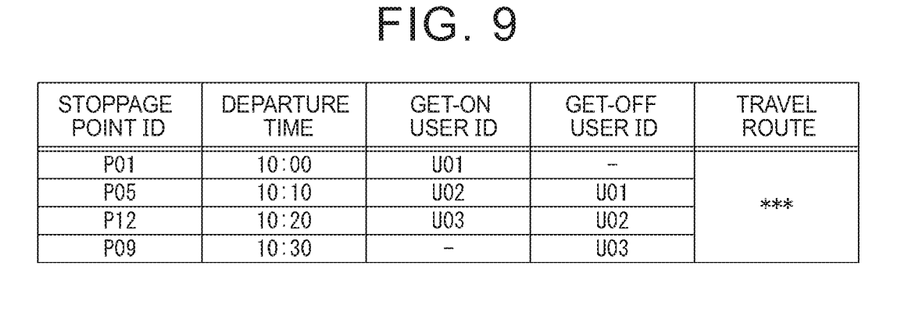
FIG. 9 is a view illustrating an example of information about a travel plan of a specific vehicle, the information being stored in the server.

In the reservation database, given information about a boarding reservation of the on-demand bus service is stored. For example, in the reservation database, data in which a user ID of a user who makes a boarding reservation is associated with a vehicle ID of the specific vehicle 20 that the user is to board is stored. Further, in the reservation database, information about a travel plan of the specific vehicle 20 is stored. For example, as illustrated in FIG. 9, the information about the travel plan includes a stoppage point ID of each stoppage point where the specific vehicle 20 stops, a departure time to leave a corresponding stoppage point, a get-on user ID of a user who gets on the specific vehicle 20 at a corresponding stoppage point, a get-off user ID of a user who gets off the specific vehicle 20 at a corresponding stoppage point, and a travel route that goes by way of each stoppage point. However, the information about the travel plan is not limited to this. Here, the stoppage point ID may be a candidate point ID of a candidate point determined as a stoppage point or may be positional information of a point determined as the stoppage point. Information stored in the reservation database can dynamically change each time a boarding reservation is made by a user.

The server controlling portion 33 includes one or more processors. The server controlling portion 33 controls operations of the whole server 30.

For example, the server controlling portion 33 stores the area information in the server storage portion 32. The area information may be acquired from the network 40 via the server communication portion 31, for example. Further, the server controlling portion 33 determines information about a travel plan of the specific vehicle 20 and stores the information in the server storage portion 32. The determination and storage of the information about the travel plan may be performed when the server controlling portion 33 receives boarding reservations from a given number of users, for example.

Further, the server controlling portion 33 transmits the information about the travel plan and the area information to the information processing device 10 via the server communication portion 31. After the transmission of those pieces of information, the server controlling portion 33 waits for the first request or the second request from the information processing device 10.

When the server controlling portion 33 receives the first request, the server controlling portion 33 makes modifications to the travel plan and reflects the modifications on the travel plan so that the user of the information processing device 10 gets on the specific vehicle 20 or gets off the specific vehicle 20 at a stoppage point designated by the first request. Note that to make modifications to the travel plan may include addition, change, or deletion of information with respect to the information about the travel plan. Further, to reflect the modifications on the travel plan may include updating the information about the travel plan stored in the reservation database of the server storage portion 32 to modified contents. More specifically, when the server controlling portion 33 receives the first request, the server controlling portion 33 adds, to the information about the travel plan, the user ID of the user of the information processing device 10 as a get-on user ID or a get-off user ID corresponding to the designated stoppage point and reflects the addition.

In the meantime, when the server controlling portion 33 receives the second request, the server controlling portion 33 determines whether or not to cause the specific vehicle 20 to go by way of a point designated by the second request as an additional stoppage point. A given technique can be employed for the determination. For example, in a case where a departure time of at least one of the stoppage points is delayed more than a predetermined standard when the designated point is added as a stoppage point, the server controlling portion 33 may determine not to cause the specific vehicle 20 to go by way of the designated point as the additional stoppage point, and in other cases, the server controlling portion 33 may determine to cause the specific vehicle 20 to go by way of the designated point. Alternatively, in a case where the point designated by the second request is within the stopping prohibition area or is not within the vehicle stoppable area, the server controlling portion 33 may determine not to cause the specific vehicle 20 to go by way of the designated point as the additional stoppage point, and in other cases, the server controlling portion 33 may determine to cause the specific vehicle 20 to go by way of the designated point.

In a case where the server controlling portion 33 determines not to cause the specific vehicle 20 to go by way of the point designated by the second request as the additional stoppage point, the server controlling portion 33 notifies the information processing device 10 of rejection of the second request via the server communication portion 31.

In the meantime, in a case where the server controlling portion 33 determines to cause the specific vehicle 20 to go by way of the point designated by the second request as the additional stoppage point, the server controlling portion 33 modifies the travel plan so that the specific vehicle 20 goes by way of the point designated by the second request as the additional stoppage point and the user of the information processing device 10 gets on the specific vehicle 20 or gets off the specific vehicle 20 at the additional stoppage point. More specifically, the server controlling portion 33 adds a stoppage point ID corresponding to the designated point (that is, the additional stoppage point), a departure time, and a get-on user ID or a get-off user ID to the information about the travel plan and makes modifications to the travel route. Note that, at this time point, the modifications have not been reflected on the travel plan yet. The server controlling portion 33 transmits information about a modified travel plan to the information processing device 10 via the server communication portion 31. After the transmission of the information, the server controlling portion 33 waits for the third request or the fourth request from the information processing device 10.

When the server controlling portion 33 receives the third request, the server controlling portion 33 reflects the modifications on the travel plan. In the meantime, when the server controlling portion 33 receives the fourth request, the server controlling portion 33 discards the modifications to the travel plan. Due to the discard of the modifications, the information about the travel plan stored in the reservation database of the server storage portion 32 is maintained to have contents before modification.

Operation Procedure of Information Processing Device

Figure 10:
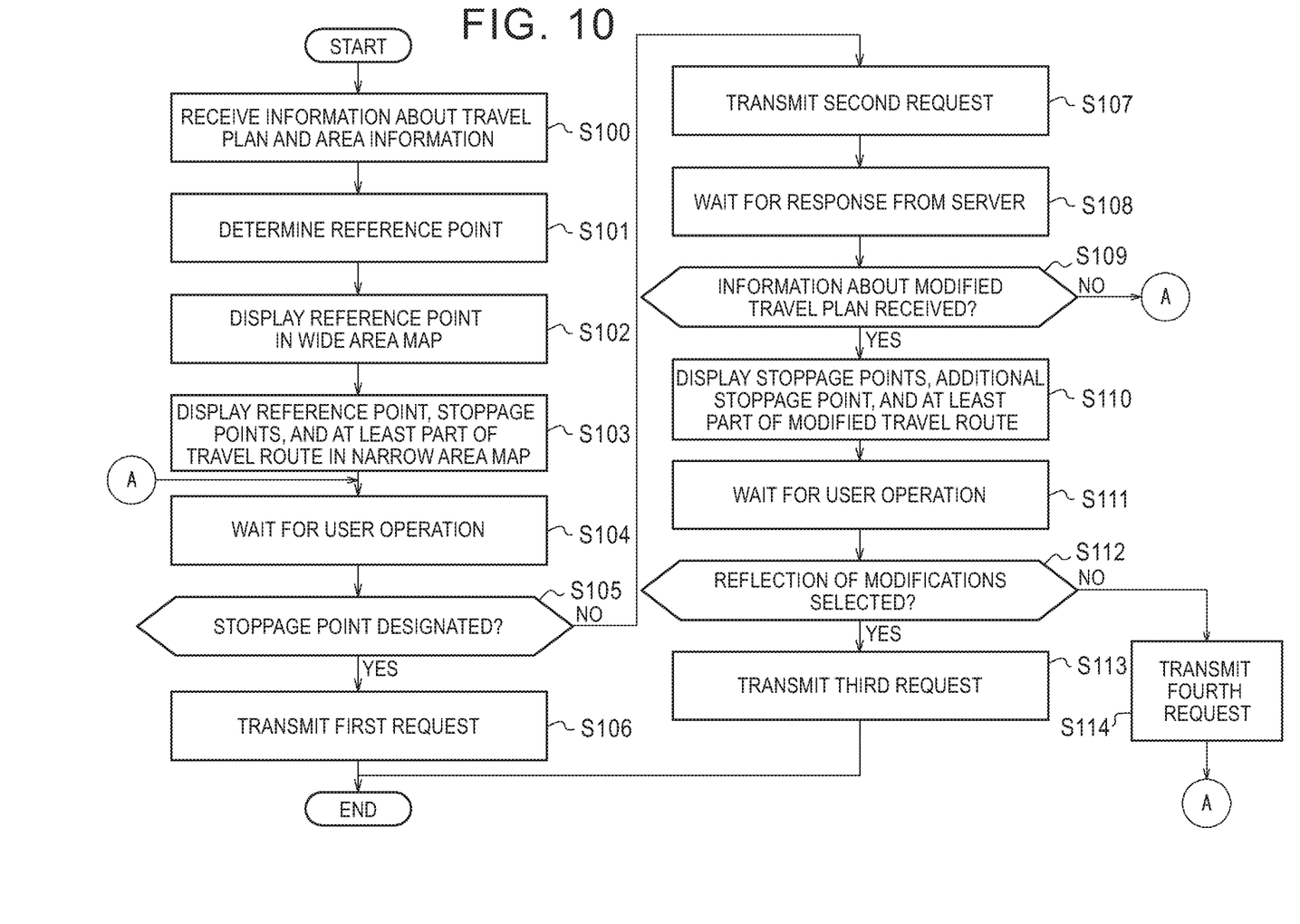
FIG. 10 is a flowchart illustrating an operation of the information processing device.

With reference to FIG. 10, the following describes the procedure of an operation of the information processing device 10.

Step S100: the controlling portion 16 receives information about a travel plan of the specific vehicle 20 and area information from the server 30 via the communication portion 11.

Step S101: the controlling portion 16 determines a reference point on a map. More specifically, the controlling portion 16 determines, as the reference point, a current point based on the position of the information processing device 10 that is acquired by the positioning portion 12 or a designated point based on a user operation on the operating portion 14.

Step S102: the controlling portion 16 displays at least the reference point in a wide area map on the screen of the display portion 13.

Step S103: after the controlling portion 16 displays the wide area map in step S102 on the screen of the display portion 13, the controlling portion 16 displays the reference point, a predetermined number of stoppage points selected in an order closer to the reference point, and at least part of a travel route in a narrow area map on the screen of the display portion 13.

Step S104: the controlling portion 16 waits for a user operation to designate a stoppage point on the screen or a point other than the stoppage points.

Step S105: the controlling portion 16 determines whether the stoppage point on the screen is designated by the user operation in step S104 or not. When the controlling portion 16 determines that the stoppage point on the screen is designated (step S105—Yes), the process advances to step S106. In the meantime, when the controlling portion 16 determines that the stoppage point on the screen is not designated, that is, when the controlling portion 16 determines that the point other than the stoppage points on the screen is designated (step S105—No), the process advances to step S107.

Step S106: the controlling portion 16 transmits, to the server 30 via the communication portion 11, the first request to modify the travel plan so that the user of the information processing device 10 gets on the specific vehicle 20 or gets off the specific vehicle 20 at the designated stoppage point. After that, the process is ended.

Step S107: the controlling portion 16 transmits, to the server 30 via the communication portion 11, the second request to modify the travel plan so that the specific vehicle 20 goes by way of the designated point as an additional stoppage point and the user of the information processing device 10 gets on the specific vehicle 20 or gets off the specific vehicle 20 at the additional stoppage point.

Step S108: the controlling portion 16 waits for a response from the server 30 after the controlling portion 16 transmits the second request. As the response from the server 30 receiving the second request, the controlling portion 16 can receive, from the server 30 via the communication portion 11, information about a travel plan modified based on the second request or a notification indicative of rejection of the second request.

Step S109: the controlling portion 16 determines whether the controlling portion 16 receives the information about the modified travel plan in step S108 or not. When the controlling portion 16 determines that the controlling portion 16 does not receive the information about the modified travel plan, that is, when the controlling portion 16 determines that the controlling portion 16 receives the notification of rejection of the second request (step S109—No), the process returns to step S104. In the meantime, when the controlling portion 16 determines that the controlling portion 16 receives the information about the modified travel plan (step S109—Yes), the process advances to step S110.

Step S110: the controlling portion 16 displays, on the screen, the stoppage points, the additional stoppage point, and at least part of the modified travel route that passes through the stoppage points and the additional stoppage point, based on the information about the modified travel plan.

Step S111: the controlling portion 16 waits for a user operation to select reflection or discard of modifications to the travel plan.

Step S112: the controlling portion 16 determines whether the reflection of the modifications on the travel plan is selected or not. When the controlling portion 16 determines that the reflection of the modifications is selected (step S112—Yes), the process advances to step S113. In the meantime, when the reflection of the modifications is not selected, that is, when the discard of the modifications is selected (step S112—No), the process advances to step S114.

Step S113: the controlling portion 16 transmits, to the server 30 via the communication portion 11, the third request to reflect the modifications on the travel plan. Then, the process is ended.

Step S114: the controlling portion 16 transmits, to the server 30 via the communication portion 11, the fourth request to discard the modifications to the travel plan. After that, the process returns to step S104.

Operation Procedure of Server

Figure 11:
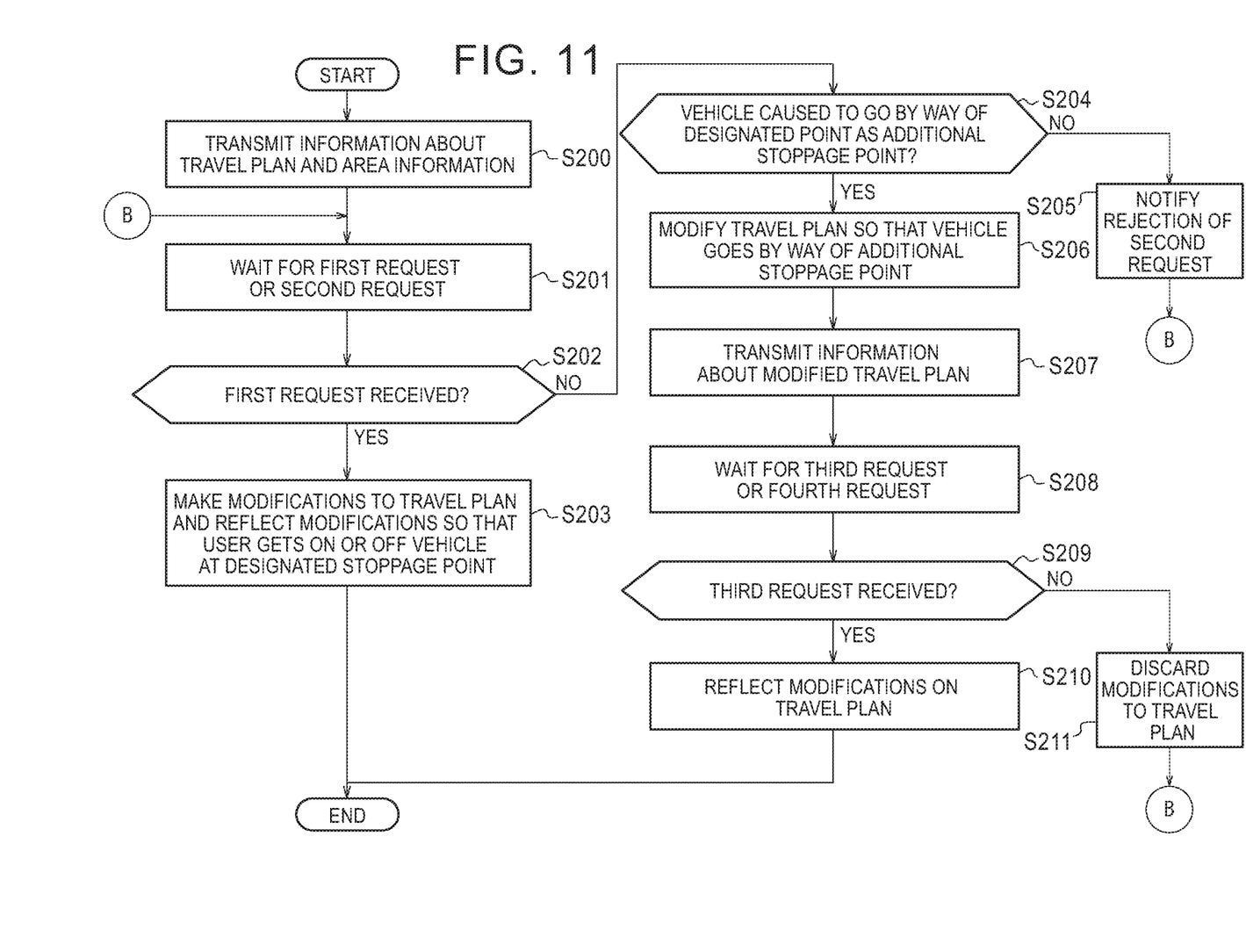
FIG. 11 is a flowchart illustrating an operation of the server.

With reference to FIG. 11, the following describes the procedure of an operation of the server 30.

Step S200: the server controlling portion 33 transmits information about a travel plan and area information to the information processing device 10 via the server communication portion 31.

Step S201: the server controlling portion 33 waits for the first request or the second request from the information processing device 10.

Step S202: the server controlling portion 33 determines whether the server controlling portion 33 receives the first request or not. When the server controlling portion 33 determines that the server controlling portion 33 receives the first request (step S202—Yes), the process advances to step S203. In the meantime, when the server controlling portion 33 determines that the server controlling portion 33 does not receive the first request, that is, when the server controlling portion 33 determines that the server controlling portion 33 receives the second request (step S202—No), the process advances to step S204.

Step S203: the server controlling portion 33 makes modifications to the travel plan and reflects the modifications on the travel plan so that the user of the information processing device 10 gets on the specific vehicle 20 or gets off the specific vehicle 20 at a stoppage point designated by the first request. After that, the process is ended.

Step S204: the server controlling portion 33 determines whether or not to cause the specific vehicle 20 to go by way of a point designated by the second request as an additional stoppage point. When the server controlling portion 33 determines to cause the specific vehicle 20 to go by way of the additional stoppage point (step S204—Yes), the process advances to step S206. In the meantime, when the server controlling portion 33 determines not to cause the specific vehicle 20 to go by way of the additional stoppage point (step S204—No), the process advances to step S205.

Step S205: the server controlling portion 33 notifies the information processing device 10 of rejection of the second request via the server communication portion 31. After that, the process returns to step S201.

Step S206: the server controlling portion 33 modifies the travel plan so that the specific vehicle 20 goes by way of the point designated by the second request as the additional stoppage point and the user of the information processing device 10 gets on the specific vehicle 20 or gets off the specific vehicle 20 at the additional stoppage point.

Step S207: the server controlling portion 33 transmits information about a modified travel plan to the information processing device 10 via the server communication portion 31.

Step S208: the server controlling portion 33 waits for the third request or the fourth request from the information processing device 10.

Step S209: the server controlling portion 33 determines whether the server controlling portion 33 receives the third request or not. When the server controlling portion 33 determines that the server controlling portion 33 receives the third request (step S209—Yes), the process advances to step S210. In the meantime, when the server controlling portion 33 determines that the server controlling portion 33 does not receive the third request, that is, when the server controlling portion 33 determines that the server controlling portion 33 receives the fourth request (step S209—No), the process advances to step S211.

Step S210: the server controlling portion 33 reflects modifications on the travel plan. After that, the process is ended.

Step S211: the server controlling portion 33 discards the modifications to the travel plan. After that, the process returns to step S201.

As has been described above, in the information processing system 1 according to the present embodiment, the information processing device 10 displays, on the screen, stoppage points of the specific vehicle 20 and at least part of a travel route that passes through the stoppage points, based on information about a travel plan of the specific vehicle 20, the information being received from the server 30. The information processing device 10 waits for a user operation to designate a stoppage point on the screen or a point other than the stoppage points. When the stoppage point on the screen is designated by the user operation, the information processing device 10 transmits, to the server 30, the first request to modify the travel plan so that the user of the information processing device 10 gets on the specific vehicle 20 or gets off the specific vehicle 20 at the stoppage point. In the meantime, when the point other than the stoppage points is designated by the user operation, the information processing device 10 transmits, to the server 30, the second request to modify the travel plan so that the specific vehicle 20 goes by way of the designated point as an additional stoppage point and the user of the information processing device 10 gets on the specific vehicle 20 or gets off the specific vehicle 20 at the additional stoppage point.

In such a configuration, for example, the user checks the stoppage points and the travel route of the specific vehicle 20 at the present moment on the screen of the information processing device 10, and when a desired stoppage point is included in the stoppage points, the user can make a boarding reservation so that the user gets on or off the specific vehicle 20 at the stoppage point. Even when the desired stoppage point is not included in the stoppage points, the user can make a boarding reservation so that the user gets on or off the specific vehicle 20 at a designated point (that is, an additional stoppage point) other than the stoppage points. This accordingly improves convenience of passenger transportation service in which a travel route of a ride-sharing vehicle is determined based on a boarding reservation made by a user.

The present disclosure is described based on the drawings and the embodiment, but it should be noted that a person skilled in the art can easily make various modifications and alterations based on this disclosure. Accordingly, it should be noted that these modifications and alterations are included in the scope of the present disclosure. For example, functions and the like included in means, steps, and the like can be rearranged within a range where the rearrangement is not logically inconsistent with the above embodiment, and a plurality of means, steps, and the like may be combined into one or may be divided.

Further, a general-purpose information processing device such as a computer, for example, can be also functionalized as the information processing device 10 or the server 30 in the above embodiment. More specifically, a program that describes process contents to realize each function of the information processing device 10 or the server 30 in the embodiment is stored in a memory of the information processing device, and the program is read and executed by a processor of the information processing device. Accordingly, the disclosure according to the present embodiment is also achievable as a program executable by a processor.

What is claimed is:

1. A non-transitory computer readable storage medium storing a computer-executable program that, when executed, causes an information processing device communicable with a server configured to manage a travel plan of a specific vehicle, to execute:
   a step of receiving information about the travel plan from the server;
   a first display step of displaying, on a display screen, a plurality of stoppage points of the specific vehicle on an area map, which are geographic locations, and at least part of a travel route passing through a subset of the plurality of stoppage points, based on the information about the travel plan after a wide area map which is wider than the area map is displayed on the display screen;
   an operation step of receiving an input to the information processing device to designate one of the plurality of stoppage points on the display screen or a point other than the plurality of stoppage points;
   a step of transmitting a first request to the server when the one of the plurality of stoppage points is designated, the first request being a request to modify the travel plan so that a passenger of the specific vehicle gets on the specific vehicle or gets off the specific vehicle at the one of the plurality of stoppage points;
   a step of transmitting a second request to the server when the point other than the plurality of stoppage points is designated, the second request being a request to modify the travel plan so that the specific vehicle travels through the point other than the plurality of stoppage points as an additional stoppage point and the passenger gets on the specific vehicle or gets off the specific vehicle at the additional stoppage point; and
   a second display step of displaying, on the display screen, the modified travel plan guiding the specific vehicle through the one of the plurality of stoppage points or the additional stoppage point, wherein:
   the subset of the plurality of stoppage points has fewer stoppage points than the plurality of stoppage points, and
   in the operation step, the point other than the plurality of stoppage points is selectable from an area other than a particular area on a map; and the particular area is an area within a predetermined distance from a respective stoppage point of the plurality of stoppage points.

2. The non-transitory computer readable storage medium according to claim 1, wherein, in the operation step, the point other than the plurality of stoppage points is selectable from one or more candidate points where the specific vehicle is to stop.

3. The non-transitory computer readable storage medium according to claim 1, wherein, in the operation step, the area other than the particular area is an area other than a stopping prohibition area on a map.

4. The non-transitory computer readable storage medium according to claim 1, further causing the information processing device to execute:
   a step of receiving information about the modified travel plan, the information about the modified travel plan being transmitted from the server in response to the second request;
   a third display step of displaying, on the display screen, the plurality of stoppage points, the additional stoppage point, and at least part of a modified travel route passing through the subset of the plurality of stoppage points and the additional stoppage point, based on the information about the modified travel plan; and
   a step of transmitting, to the server, a third request to reflect modifications on the travel plan or a fourth request to discard the modifications.

5. The non-transitory computer readable storage medium according to claim 1, further causing the information processing device to execute:
   a step of determining, as a reference point, a current point of the information processing device or a point designated on the wide area map based on a passenger operation; and
   an additional display step of displaying the reference point on the wide area map on the display screen before the first display step, wherein, in the first display step, the reference point, the subset of the plurality of stoppage points, and the at least part of the travel route is displayed, on the display screen, on the area map which is narrower than the wide area map.

6. An information processing method executed by an information processing device communicable with a server, the server being configured to manage a travel plan of a specific vehicle, the information processing method comprising:
   a step of receiving information about the travel plan from the server;
   a first display step of displaying, on a display screen, a plurality of stoppage points of the specific vehicle on an area map, which are geographic locations, and at least part of a travel route passing through a subset of the plurality of stoppage points, based on the information about the travel plan, after a wide area map which is wider than the area map is displayed on the display screen;
   an operation step of receiving an input to the information processing device to designate one of the plurality of stoppage points on the display screen or a point other than the plurality of stoppage points;
   a step of transmitting a first request to the server when the one of the plurality of stoppage points is designated, the first request being a request to modify the travel plan so that a passenger of the specific vehicle gets on the specific vehicle or gets off the specific vehicle at the one of the plurality of stoppage points;

a step of transmitting a second request to the server when the point other than the plurality of stoppage points is designated, the second request being a request to modify the travel plan so that the specific vehicle travels through the point other than the plurality of stoppage points as an additional stoppage point and the passenger gets on the specific vehicle or gets off the specific vehicle at the additional stoppage point; and a second display step of displaying, on the display screen, the modified travel plan guiding the specific vehicle through the one of the plurality of stoppage points or the additional stoppage point, wherein:

the subset of the plurality of stoppage points has fewer stoppage points than the plurality of stoppage points, and in the operation step, the point other than the plurality of stoppage points is selectable from an area other than a particular area on a map; and the particular area is an area within a predetermined distance from a respective stoppage point of the plurality of stoppage points.

* * * * *